US012739458B2

(12) United States Patent
Ullah et al.

(10) Patent No.: US 12,739,458 B2
(45) Date of Patent: Sep. 15, 2026

(54) SYSTEM AND METHOD FOR CREATING A CHANNEL SCHEDULE

(71) Applicant: ThinkAnalytics Ltd., Glasgow (GB)

(72) Inventors: Asim Ullah, Glasgow (GB); Ewen Cattanach, Glasgow (GB); Christopher McGuire, Glasgow (GB); Peter Docherty, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 0 days.

(21) Appl. No.: 18/753,966

(22) Filed: Jun. 25, 2024

(65) Prior Publication Data

US 2025/0392774 A1 Dec. 25, 2025

(51) Int. Cl.

| | |
|---|---|
| ***H04N 21/262*** | (2011.01) |
| ***H04N 21/25*** | (2011.01) |
| ***H04N 21/258*** | (2011.01) |
| ***H04N 21/2668*** | (2011.01) |
| ***H04N 21/845*** | (2011.01) |

(52) U.S. Cl.

CPC ..... *H04N 21/26208* (2013.01); *H04N 21/251* (2013.01); *H04N 21/25866* (2013.01); *H04N 21/2668* (2013.01); *H04N 21/8456* (2013.01)

(58) Field of Classification Search

CPC ........... H04N 21/26208; H04N 21/251; H04N 21/25866; H04N 21/2668; H04N 21/8456

See application file for complete search history.

(56) References Cited

U.S. PATENT DOCUMENTS

| | | | | |
|---|---|---|---|---|
| 8,281,339 | B1 * | 10/2012 | Walker | H04N 21/4755 705/14.4 |
| 10,425,700 | B2 | 9/2019 | Loheide et al. | |
| 11,343,573 | B2 | 5/2022 | Docherty et al. | |
| 11,665,383 | B2 * | 5/2023 | Aher | G06F 16/735 725/45 |
| 2002/0144281 | A1 | 10/2002 | Taguchi et al. | |
| 2008/0172695 | A1 * | 7/2008 | Migos | H04N 21/42204 725/45 |
| 2011/0113454 | A1 * | 5/2011 | Newell | H04N 21/2743 725/63 |
| 2015/0074718 | A1 * | 3/2015 | Moguillansky | H04N 21/482 725/40 |
| 2024/0107099 | A1 | 3/2024 | Warenica et al. | |
| 2025/0203160 | A1 * | 6/2025 | Chen | H04N 21/4314 |
| 2025/0310587 | A1 * | 10/2025 | Ullah | H04N 21/251 |

FOREIGN PATENT DOCUMENTS

| | | | |
|---|---|---|---|
| GB | 2 574 581 | A | 12/2019 |

* cited by examiner

*Primary Examiner* — Nnenna N Ekpo
(74) *Attorney, Agent, or Firm* — Foley & Lardner LLP

(57) ABSTRACT

A computer-implemented method and system for creating a channel schedule for a linear broadcasting content provider, is disclosed. The method comprises: obtaining metadata associated with a plurality of content items in a content catalogue, the metadata representing at least some properties of the content items; segmenting the plurality of content items into segments based on metadata similarity; creating one or more channels based on the segments; and scheduling the plurality of content items, in the respective segments, for the one or more channels.

20 Claims, 8 Drawing Sheets

Table 1 – learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Figure 2

SYSTEM AND METHOD FOR CREATING A CHANNEL SCHEDULE

FIELD OF THE INVENTION

The present disclosure relates to a system and method for creating a channel schedule for a linear broadcasting content provider.

BACKGROUND OF THE INVENTION

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic program guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest. However, traditional content recommendation systems only work with video-on-demand systems.

For linear broadcast content providers, content is streamed 'live' to multiple users according to a broadcasting schedule.

SUMMARY

In a first aspect of the disclosure, there is provided a computer-implemented method for creating a channel schedule for a linear broadcasting content provider, the method comprising:

- obtaining metadata associated with a plurality of content items in a content catalogue, the metadata representing at least some properties of the content items;
- segmenting the plurality of content items into segments based on metadata similarity;
- creating one or more channels based on the segments; and
- scheduling the plurality of content items, in the respective segments, for the one or more channels.

Embodiments of the disclosure therefore provide a method which can be used to create a channel schedule for live streamed content wherein the content in the channel has been selected based on metadata similarity. As such, channels can be quickly created according to a wide variety of individual or combined criteria including, for example, theme, mood, setting, actor or writer. Advantageously, content providers can use this method to create more channels than they previously would have because the analysis of the metadata facilitates previously unidentified connections between the content items. In addition, live streamed content can be easily presented to viewers via themed channels, which can simply be selected according to the viewer's tastes without them having to scroll through multiple diverse channels and channel-hop in order to watch the content they are most likely to enjoy. In other words, the system running the method can effectively provide a schedule of live streamed content for broadcasting on multiple themed channels that can be viewed continuously.

It is common for content providers to have access to thousands of content items (assets) in their content catalogue and an even larger amount of data associated with the content items. For example, 10,000 shows may be available to a content provider having, say, 20 different channels on which to broadcast content. The 10,000 shows will typically each have multiple constraints (for example, relating to language, regionality, availability, episode order, time of transmission etc.) and it is an extremely complex problem for content providers using expensive manual labour to assess each asset individually and to try to appreciate overall themes within the available content catalogue in order to determine: i) how to group content for different channels; ii) how to select content for each of the channels; and iii) how to schedule that content in an efficient and effective manner. Aspects of the present invention therefore aim to address this complexity to determine a suitable grouping of content for different channels; a suitable selection of content for each channel; and a suitable schedule for each channel.

The step of obtaining the metadata may comprise retrieving metadata, which has already been associated with the plurality of content items, from a memory or database. In some cases, the step of obtaining the metadata may comprise associating the metadata with the plurality of content items using, for example, a metadata engine configured to analyse the plurality of content items and extract the metadata therefrom.

The segments may overlap. Thus, an individual content item may be categorised in one or more segments. For example, an individual content item may be categorised in one segment relating to comedy, and another segment relating to a specific theme. As such, it may be possible for the same content item to be included in a schedule for two (or more) different channels.

The method may comprise ranking the plurality of content items in the respective segments and selecting content items for scheduling, based on the ranking.

The method may comprise checking constraints associated with the plurality of content items and selecting content items for scheduling, in view of the constraints.

The ranking and/or constraints may be based on one or more of: a popularity of the content items; a language of the content items; regionality of the content items; availability of the content items; a type of the content items; metadata associated with the content items; a rule associated with the content items (for example, based on episode order; time of transmission; or only being allowed to broadcast a certain content item a predetermined number of times in a week); or user activity associated with the content items.

The method may further comprise determining a weighting for the metadata associated with the content items and using the weighting to determine the ranking for each content item in the respective segments. The weighting may relate to an importance of each piece of metadata in relation to the content item.

The user activity associated with the content items may comprise interaction, by a plurality of users, in relation to the content items and/or content items with similar metadata. The method may further comprise monitoring user activity including identifying content that a user of a user device has interacted with and adding content item identifiers, for the identified content, to a user data store.

The step of segmenting the plurality of content items into segments may comprise:

- obtaining user-derived metadata representing at least some properties associated with a plurality of content items interacted with by a plurality of users; and
- comparing the user-derived metadata with the metadata representing at least some properties of the content items in the content catalogue to determine the segments most likely to be popular with the plurality of users.

The method may further comprise determining a first weighting for the user-derived metadata and obtaining a second weighting for the metadata representing at least some properties of the content items in the content catalogue and comparing the second weighting with the first weighting to determine the segments.

The segmentation may be based on how closely the metadata representing at least some properties of the content items in the content catalogue matches the user-derived metadata. The method may comprise ordering the content items in each segment from most closely matching to least closely matching. The method may comprise ordering or, at the very least, filtering, the content items in each segment based on popularity and/or viewing pattern. For example, a channel may be created based on grouping by thematic metadata and viewing data may be used to order the content items for the channel so that the schedule reflects viewing patterns to build stronger user engagement. Alternatively, different content items may be selected which reflect the types of content which resonate best with the viewers.

The scheduling of the plurality of content items may comprise retrieving, from a memory, scheduling information relating to each content item; and determining an appropriate timeslot for the plurality of content items according to the scheduling information.

The method may further comprise optimising the scheduling based on user activity associated with the content items.

The step of creating one or more channels based on the segments may comprise identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users.

The method may further comprise repeating the steps of:

- obtaining metadata associated with a plurality of content items in a content catalogue, the metadata representing at least some properties of the content items;
- segmenting the plurality of content items into segments based on metadata similarity;
- creating one or more channels based on the segments; and
- scheduling the plurality of content items, in the respective segments, for the one or more channels;
- at predefined intervals and/or on receipt of an instruction from an operator and/or in response to a determination that the segmenting be updated.

The predefined intervals may be, for example, daily, weekly, fortnightly, monthly, quarterly or annually.

For example, a first schedule may be created including a week's worth of content, with subsequent schedules being created for subsequent weeks. Notably, a week's worth of content may or may not include content for every hour or minute of every day. In some cases, for example, an eight-hour schedule may be provided, which may or may not be repeated over the course of a day.

In general, one or more of the plurality of content items, the metadata, the segments, the channels, the ranking, the constraints and the scheduling may be updated, refreshed, regenerated or optimised.

The method may further comprise determining whether the segmenting should be updated by performing the steps of: obtaining updated metadata associated with a plurality of content items in an updated content catalogue, the metadata representing at least some properties of the content items; and segmenting the plurality of content items into updated segments based on updated metadata similarity; and checking whether the updated segments are consistent with the segments used to create the one or more channels. If the updated segments are inconsistent with the segments used to create the one or more channels, one or more new channels may be created based on the updated segments.

The linear broadcast content may be provided by a Free Ad-supported Streaming Television (FAST) channel provider.

The method may further comprise providing the one or more channel schedules to the linear broadcasting content provider for scheduled broadcasting of the content items in each channel. Optionally, the one or more channel schedules may be provided as initial suggestions of channel schedules, which the linear broadcasting content provider may adopt or adapt to suit their needs.

The interaction, by the plurality of users, in relation to the content items and/or content items with similar metadata may comprise content items having been one or more of, for example: selected, viewed, recorded, purchased, read, listened to, played, shared, content rated, commented on, downloaded, watched, bookmarked, browsed, added to a shopping basket, watched or listened to a trailer, clicked on a search result, remotely recorded, set a reminder for, liked, disliked, tweeted, posted on social media, played purchased content, stopped watching, stopped playing or otherwise interacted with.

The metadata may comprise, for example, data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

The content items may comprise, for example, one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The method may further comprise storing the user activity and/or interacted content items and/or metadata associated with the interacted content items in user profiles in a first memory resource remote from user devices and/or storing the scheduled content items and/or metadata associated with the scheduled content items in one or more content memory resource.

In a second aspect of the disclosure, there is provided a system for creating a channel schedule for a linear broadcasting content provider, the system comprising processing circuitry configured to:

obtain metadata associated with a plurality of content items in a content catalogue, the metadata representing at least some properties of the content items;

segment the plurality of content items into segments based on metadata similarity;

create one or more channels based on the segments; and schedule the plurality of content items, in the respective segments, for the one or more channels.

In a third aspect of the disclosure, there is provided a non-transitory computer-readable medium that comprises computer-readable instructions that are executable to perform a method for creating a channel schedule for a linear broadcasting content provider, the method comprising:

obtaining metadata associated with a plurality of content items in a content catalogue, the metadata representing at least some properties of the content items;

segmenting the plurality of content items into segments based on metadata similarity;

creating one or more channels based on the segments; and scheduling the plurality of content items, in the respective segments, for the one or more channels.

The features described above in relation to the first aspect may equally be applied to the second and third aspects.

The content items may be provided by a content distribution system (or content provider system) and may comprise at least one of a TV distribution system, a TV subscription service, a video-streaming system.

The content distribution system has a plurality of users and may comprise at least 10,000 user devices, optionally at least 100,000 user devices, optionally at least 1,000,000 user devices.

The content items may be configured for a user device such as a set top box, a television, a mobile device, a smartphone, a computer, a tablet, a game console or other device.

Reference to a user may include reference to a subscriber. A subscriber may have a plurality of users associated with it. For example, a subscription may be associated with a household and there may be a plurality of users, for example family members, associated with the subscription and who may, for example, interact with content.

The method may further comprise storing a channel schedule in a database and/or outputting the channel schedule via a batch process.

The method may comprise opening a channel scheduling session prior to obtaining metadata associated with the plurality of content items in the content catalogue.

The method may comprise retrieving user data for a plurality of users from a first storage resource, storing the user data in a second storage resource, and maintaining the user data in the first and/or second storage resource during the channel scheduling session.

The method may comprise using the user data from the second storage resource and content information from one or more content sources to generate at least one channel schedule during the channel scheduling session.

At least one channel schedule may be provided to an operator device or server of the linear broadcasting content provider, either directly or indirectly. The at least one channel schedule may be provided to a further device, database and/or system that may process and/or send the at least one channel schedule to the linear broadcasting content provider.

The first storage resource may comprise at least one of a remote storage resource and a less rapidly readable storage resource, and/or the second storage resource may comprise at least one of a local storage resource and a more rapidly readable storage resource.

The first storage resource may comprise a hard disk storage resource and the second storage resource may comprise random access memory (RAM).

The user data, for each user, may be stored in the first storage resource at substantially contiguous physical storage locations.

Storing the user data, for each user, at substantially contiguous physical locations may comprise storing the user data in a single sector of the first storage resource, or in a plurality of substantially contiguous sectors of the first storage resource.

The user data may be updated in one or more of the first storage resource and the second storage resource during the channel scheduling session. For example, the user data in the second storage resource may represent a snapshot of the user data in the first storage resource at a beginning of the channel scheduling session.

In some cases, the user data may be maintained in parallel in both the first and second storage resources, for example both in a hard disk resource in RAM.

The updating of the user data in the second storage resource may be performed in response to each new relevant user action, and the updating of the user data in the first storage resource may be performed at least one of:

a) in response to an expiry of the channel scheduling session;

b) periodically;

c) in response to at least one of processing capacity or communication capacity being available.

The updating of the user data in the first storage resource may comprise copying of at least some of the data from the second storage resource to the first storage resource.

The updating of the user data in the first storage resource and the updating of the user data in the second storage resource may be both performed in response to each new relevant user action.

The updating of the user data for each user in the first storage resource may comprise storing the updated user data for the each user at substantially contiguous physical locations at the first storage resource.

The updated user data for each user may comprise new user data and pre-existing user data, and the storing of the updated user data for each user may comprise storing the new user data in the first storage resource at physical locations substantially contiguous with physical locations at which the pre-existing user data for each user is stored.

The pre-existing user data for each user may comprise user data for each user that was already stored in the first storage resource at the start of the channel scheduling session.

The method may comprise deleting the user data for each user from the second storage resource in response to at least one of: expiry of the channel scheduling session; the second storage resource being full or exceeding a threshold storage limit.

The user data may comprise user preference data based at least in part on user activity and, optionally, on at least one user preference selection by the user.

The user data may comprise at least one of: user action data representing previous user actions, optionally content selection, viewing or recording actions, user language data and/or episode data; content metadata representing properties of content viewed, recorded or selected by a user.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 2 is a representation of certain database learning tables used by the system of FIG. 1;

DETAILED DESCRIPTION

In TV systems, or other systems for provision of content to a user, each service provider may have thousands, tens or hundreds of thousands, or millions of users. In addition, each service provider may have thousands, tens or hundreds of thousands of content items in their content catalogue. Consequently, selecting specific content items to be included in a broadcasting schedule may not be straight-forward.

Although each user is unique and may have different viewing habits and preferences, trends in overall viewing habits may become apparent by monitoring user activity.

Tracking, recording and processing large volumes of user data and large amounts of content data in order to determine what and how content should be scheduled, taking into account the constraints demanded by a viewer and by the system poses a significant technical challenge.

An ability to maintain anonymity of the users (e.g. to avoid issues in connection with the General Data Protection Regulation (GDPR) or similar) when monitoring user activity in order to create appropriate channel schedules, may be important. The content provider system and/or the channel scheduling system described herein may be configured so as to restrict or not allow access to personal information, or data that could be used to determine the name of a user, or demographic information concerning the user.

Figure 1:
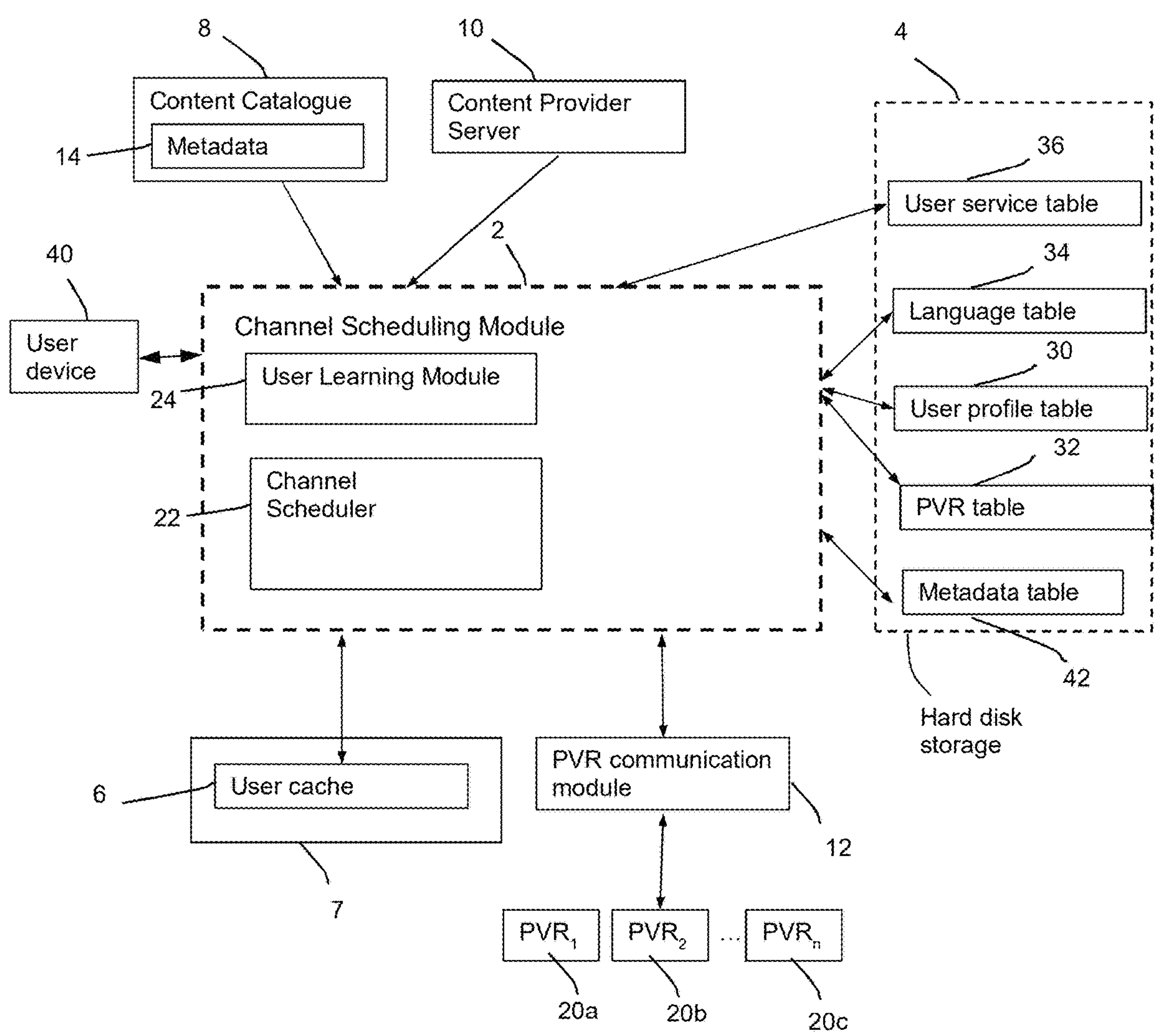
FIG. 1 is a schematic diagram of a system for creating a channel schedule.

The system of FIG. 1 is able to provide useful channel schedules taking into account thousands, tens of thousands or even hundreds of thousands or more available content items.

FIG. 1 shows a schematic diagram of a channel scheduling system according to the disclosure. The system is able to provide a channel schedule, for broadcasting, based on analysis of typically thousands of content items and, optionally, monitoring of user actions for many thousands, tens of thousands or even hundreds of thousands or more users.

Example modes of operation are described below but content for the channel schedule may be broadcast so as to be accessible via any suitable devices, for example set-top boxes, smartphones, personal computers (PCs) or tablets or any other suitable content delivery mechanism.

The system comprises a channel scheduling module 2 linked to a first storage resource in the form of a hard disk storage device 4, which is used to store various user data. The channel scheduling module 2 is also communicatively linked to a second storage resource in the form of a local storage device that includes at least one cache, for example a user cache 6. In the system of FIG. 1 the local storage device is in the form of RAM 7 but any suitable storage device may be used. The user cache 6 may be used for temporary storage of user data obtained from the hard disk storage device 4 during a channel scheduling session, as discussed in more detail below.

As shown in FIG. 1, the channel scheduling module 2 comprises a user learning module 24 and a channel scheduler 22.

The user learning module 24 is configured to monitor user activity including identifying content that the user of a user device 40 has interacted with, for each of a plurality of user devices 40. Optionally, the user learning module 24 may obtain metadata concerning the identified items of content, the metadata representing at least some properties of the identified items of content.

The channel scheduler 22 is configured for obtaining metadata associated with a plurality of content items in a content catalogue, the metadata representing at least some properties of the content items; segmenting the plurality of content items into segments based on metadata similarity; creating one or more channels based on the segments; and scheduling the plurality of content items, in the respective segments, for the one or more channels.

As discussed further below, the channel scheduling module 2 is able to communicate, either directly or indirectly, and either via wired or wireless connection, with very large numbers of users via user devices 40 to monitor user activity and to provide channel schedules for linear broadcasting content providers via a content provider server 10. Other than some personal video recorders (PVRs) which are shown schematically in FIG. 1, multiple user devices 40 are not shown in FIG. 1 for clarity. However, it will be understood that although a number n of PVRs (20*a*, 20*b*, 20*c*) are shown communicatively connected to the channel scheduling module 2 via a PVR communication module 12, the PVRs may constitute or be comprised within user devices 40.

The channel scheduling module 2 is also linked to sources of information concerning available content, in this case via a content catalogue 8 configured to provide information, including metadata 14, concerning content available to the content provider (for example, films, and TV programs which are available for scheduling). A variety of other sources of content may be available as well as, or in addition to, the content catalogue 8, for example internet content and/or any suitable content available for broadcasting via wired or wireless connection.

The metadata 14 may be stored in a database or memory together with the content catalogue 8 or may be stored in a separate database or memory. In some cases, the channel scheduling module 2 may simply retrieve already stored metadata 14 and in other cases, the channel scheduling module 2 may be configured to generate the metadata 14 for the content items in the content catalogue 8 as will be explained in more detail below.

In the embodiment of FIG. 1, the content catalogue 8, the channel scheduling module 2, the user cache 6, the PVR communication module 12, the channel scheduler 22 and the user learning module 24 are implemented in one or more servers. The servers each include communication circuitry that enables communication between the respective server, or appropriate components of the server with each of the user devices 40, and with the content provider server 10, for example a TV service operator or other content service operator.

Any other suitable implementation of the content catalogue 8, the content provider server 10, the channel scheduling module 2, the user cache 6, the PVR communication module 12, the channel scheduler 22 and the user learning module 24 may be provided in alternative embodiments, for example they may be implemented in any software, hardware or any suitable combination of software and hardware. Furthermore, any one of the components as described in relation to FIG. 1 or other embodiments may be combined with any other one(s) of the components, or any one of the components may be split into multiple components providing the same or similar functionality.

The content catalogue 8 may obtain information concerning available content from other content sources, for example a TV service operator or other content service operator. The content information may comprise metadata 14 of content, for example, television program metadata. The metadata 14 may be representative of a variety of different content parameters or properties, for example but not limited to program title, time, duration, content type, program categorization, actor names, genre, release date, episode number, series number. It is a feature of certain embodiments that the metadata 14 stored at the content catalogue 8 may also be enriched with additional metadata, for example by the operator of the channel scheduler system, such that additional metadata 14 to that provided by the content sources or other external sources may be stored.

In FIG. 1 the channel scheduling server, in particular the channel scheduling module 2, communicates directly with each of the user devices 40, for example to monitor user activity, to identify content that the user of a user device 40 has interacted with, and to store user data relating to the identified content in the hard disk storage device 4. In some embodiments, the channel scheduling module 2 communicates with the user devices 40 via the content sources or via other servers or devices. For example, in such other embodiments, user activity data may be sent to the channel scheduling server via one of the content source servers or other server or device.

In FIG. 1 the system operates to create a channel schedule using the content catalogue 8 to provide a content schedule for one or more channels, which may be broadcasted by the content provider server 10 to the user devices 40.

The operation of the channel scheduling system is controlled by the channel scheduling module 2. As can be seen in FIG. 1, the channel scheduling module 2 is configured to communicate with the one or more content information modules: in this case, the content catalogue 8 including the metadata 10. The channel scheduling module 2 is also configured to communicate with the user cache 6 local to the channel scheduling module 2, the hard disk storage resource 4 and the one or more PVRs. A data access layer provides a communication interface between the channel scheduling module 2 and the hard disk storage resource 4. The personal video recorder (PVR) communication module 12 provides a communication interface between the one or more PVRs 20*a*, 20*b*, . . . 20*z* and the channel scheduling module 2.

The channel scheduling module 2 has a channel scheduler 22 and a user learning module 24. The channel scheduler 22 applies a set of processes to obtain metadata 14 associated with a plurality of content items in the content catalogue 8, the metadata 14 representing at least some properties of the content items; segmenting the plurality of content items into segments based on metadata 14 similarity; creating one or more channels based on the segments; and scheduling the plurality of content items, in the respective segments, for the one or more channels.

The user learning module 24 receives data indicative of selections or other actions by a user and builds up a set of user data, for example comprising or representing a user history or profile, which is stored in the hard disk storage 4, and which is used in some embodiments to generate a channel schedule tailored to the tastes of a group of users. Operation of the channel scheduler 22 and the user learning module 24 is discussed in more detail below.

In relation to FIG. 1, a request for a channel schedule may be received by the channel scheduling module 2, for example, from the content provider server 10. A user action carried out on any of the user devices 40 may also be received by the channel scheduling module 2. In addition to receiving requests for channel scheduling, the channel scheduling module 2 is configured to log user activity. By logging user activity and storing activity over an extended period of time, the channel scheduling module 2 and the hard disk storage 4 can build up an overall picture of the viewing activities, habits and preferences of a plurality of users. User actions are turned into learn actions by the user learning module 24, which may be processed by the channel scheduler 22.

The system of FIG. 1 is configured to operate with a plurality of user devices 40 each associated with at least one user. The plurality of user devices 40 may comprise a large number of devices, for example thousands, tens or hundreds of thousands, or even millions of devices. Each user device 40 may be any device or combination of devices that is configured to enable a user to view or otherwise consume content. For example, each user device 40 may comprise an internet-enabled device and/or a device for providing video or other content on demand but at least it is a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user may be a viewer of the user device 40. Alternatively or additionally, the user may be a subscriber and/or customer of a service accessible through the user device 40.

The user device 40 is communicatively coupled to the channel scheduling module 2. The channel scheduling module 2 has an application programming interface (for example a scheduling engine API) that provides a set of rules for monitoring user activity and carrying out a channel scheduling procedure.

The user cache 6 is coupled to the channel scheduling module 2 and is configured to store data that be used for the channel scheduling procedure. The channel scheduling module 2 can access data stored on the user cache 6. The user cache 6 may be provided in random access memory (RAM) 7.

The hard disk storage 4 is communicatively coupled to the channel scheduling module 2. The hard disk storage 4 stores data, which may be used by the channel scheduling module 2. The hard disk storage 4 is configured to store one or more databases. Entries from the databases on the hard disk storage resource 4 may be retrieved by the channel scheduling module 2 via requests made through a data access layer. Entries in the databases may also be updated via the data access layer.

The database(s) at the hard disk storage 4 store user data that may be used by the channel scheduling module 2 to determine a channel schedule. In the embodiment of FIG. 1 a set of database tables is provided that store information concerning the users.

In the embodiment of FIG. 1, the tables may include at least one user service table 36 that represents user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables, for example, the user profile table 30, may include various user learning tables that include data representing for example the viewing activities, habits and preferences of each user. The user data can include data representing for example explicit ratings given by a user to a particular program or other item of content. It is a feature of the embodiment of FIG. 1 that the user data also includes data representing actions, for instance viewing actions, taken by a user.

For example, if a user selects a program or other item of content and views or otherwise consumes it for greater than a threshold period of time then a learn action is generated and at least one user data item for that user is stored in at least one of the tables. The data item may include various data including for example start and stop viewing time, time slot identifier, program identifier, at least some metadata concerning the program (which may be stored in metadata table 42, although such metadata may be stored separately as content data rather than user data in some embodiments, and linked to or otherwise accessed if required, for example by the program name or other identifier).

The user learning module 24 determines whether user data should be stored in the tables in respect of a particular user action or set of actions. For example, if a user only views a program for a very short period of time, for instance if they are channel surfing, then user data is not stored in the user learning tables in respect of that action. User data can be stored in respect of a variety of different user actions or events, for example selecting, viewing, recording or searching for content.

The learned language table 34 stores data relating to audio languages of content items that have been user actioned by the user.

The PVR table 32 stores data associated with content a user has recorded on their PVR.

In the embodiment of FIG. 1 it can be understood that a large part of the user data comprises user history or user action data that represent user actions over a significant period of time. The channel scheduling module 2 can use such user data during a channel scheduling procedure to determine which channels to create and/or which content to include in a channel schedule.

In various embodiments, there is a limit to how long user data is kept or used. For example in the embodiment of FIG. 1 after a threshold period, for example six months or a year after being collected, items of user data may be deleted. Thus, in some embodiments the user data for a particular user may include only relatively recent user action data, although the amount of data may still be substantial.

In the embodiment of a FIG. 1, a distinction is made between different types of user and different sets of the tables may be stored for the different types of users.

It will be understood that requests (e.g. for user data) and results may be communicated between different parts of a network using one or more application program interfaces (APIs). The API defines the parameters and other data to be included in the request and the form and format of the results from the request.

FIG. 2 is a representation of certain database learning tables stored on the hard disk storage resource 4 of the embodiment of FIG. 1. The channel scheduling module 2 supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favorite content item group information: content source (e.g. electronic program guide EPG or video on demand VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) is stored. In that case, metadata and content recommendations, for example, may be based on attributes and/or user actions for a plurality of users associated with the same subscription, for example different members of the same household. The second is time-slot mode where content recommendations may be generated in dependence on the particular time slot in question. For example user data generated for a particular time slot may be used selectively in generating metadata for a particular time slot (potentially with user data generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programs for certain time slots, for instance late afternoon time slots, making actions associated with children's programs more likely during those time slots.

Anonymous profiles may be used to recommend content, for example, when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, anonymous session tracking can be performed using cookies, wherein on a first request a cookie containing a unique identification is added and in later sessions used to identify the anonymous user. This works in a web environment. A cookie session profile holds a list of cookies that are known to the system together with data referring to when the cookie was created or last accessed by the system.

For each user of all categories, the system has separate groups of learning tables. In FIG. 2, the learning tables shown include "learned language", "content item ratings", "feature ratings" and "watched episodes". These tables are shown by way of example and other tables may be created such as "exclude content group". Other tables may also be stored in the embodiment of FIG. 1. Each user may have explicit preferences and implicit preferences. Explicit preferences are information the consumer tells the system by, for example, entering a questionnaire. Implicit preferences are information learned by the system through user actions. Data corresponding to user actions for the purpose of learning are stored in the learning tables.

The learned language table 34 stores data relating to audio languages of content items that have been user actioned by the user. For example, the table can store learned language information, the date at which the language was learned and an indication of whether or not the entry has been aged out.

The content item ratings table stores data representing properties of content such as the features, actors, channels. Feature ratings allows learn actions to specify properties of content information instead of the content item. A customer is capable of applying ratings to a content item. Rating information is stored in the customer feedback table (e.g. user profile table 30) and includes: time and date rating given; customer identifier; activity identifier; name and identifier of content item rated; content item group identifier if content item associated with a content item group; rating value; a scaled rating value to be used by the channel scheduling module 2; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to a last actioned episode of a series as actioned by a user. For example, for each customer the episode history for the customer is stored. This includes a series identifier; a series title; a season and episode number, and the date and time the user action occurred.

The exclude content group table may store data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call center, set-top box). For content item groups, this information includes: customer identifier, time and date content item group excluded; content source; client type ID. In both cases, a flag is included that indicates whether or not the exclusion has been aged out.

In some embodiments, different data tables or combinations of data tables may be stored.

Although a particular system arrangement is shown in FIG. 1, there are various system arrangements that could be used. Notably, the channel scheduler 22 may be most interested in combined user data, as opposed to individual user data, in order to determine the type of content that the majority of the users will enjoy.

Figure 3:
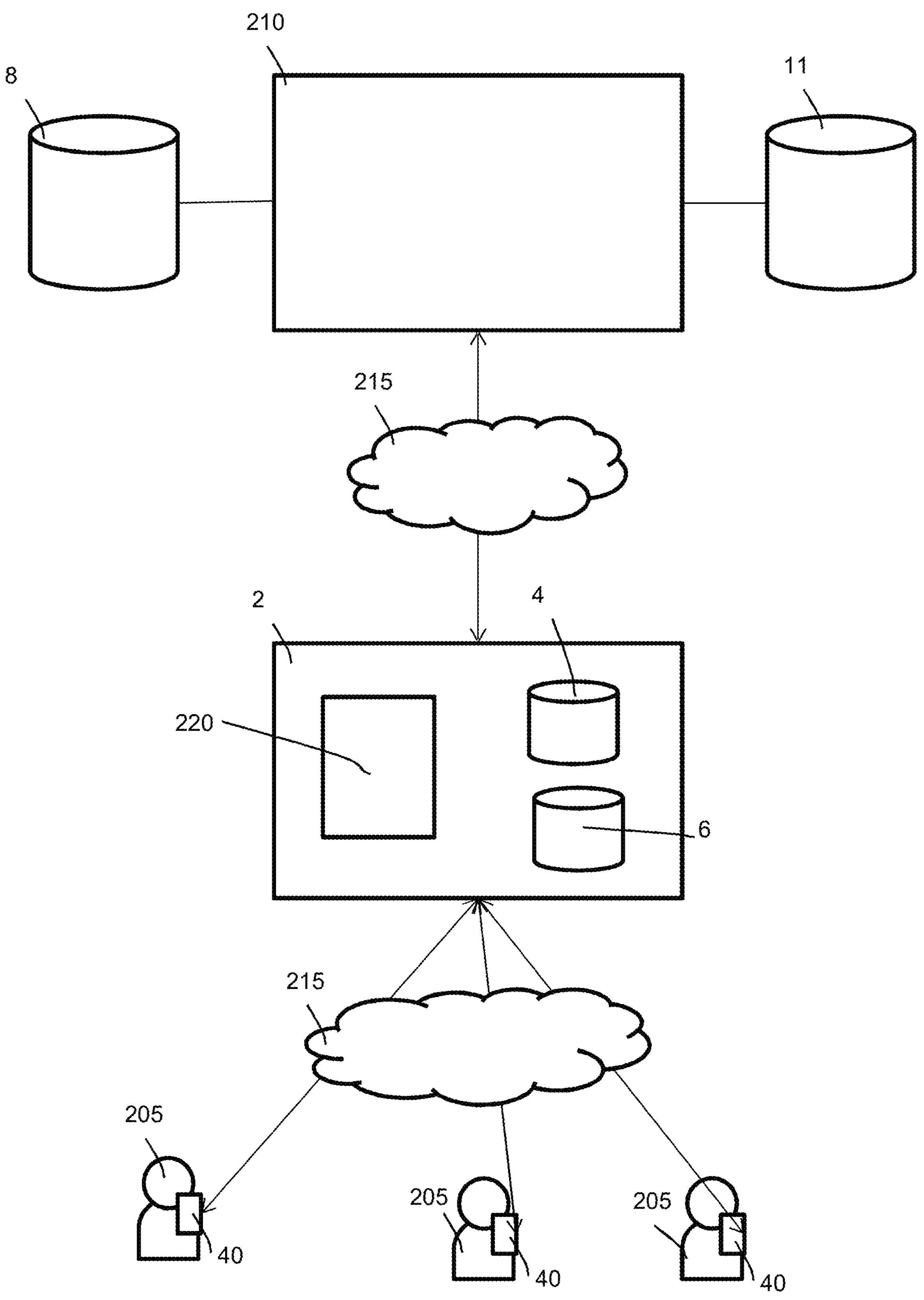
FIG. 3 is a simplified schematic of the system of FIG. 1.

FIG. 3 shows a "middleware" arrangement in which the channel scheduling module 2 sits as "middleware" between users 205 and systems of a content provider 210. The content provider systems 210 are configured to provide a variety of content, e.g. real-time linear television scheduled from a content catalogue 8 and, optionally, VOD 11 to a plurality of users 205. The channel scheduling module 2 is implemented by processing resource 220 (which may comprise one or more processors) with the storage device 4 and user cache 6. In some examples, the channel scheduling module 2 can be implemented by a cloud computing system, by one or more servers or other suitable enterprise level computing system. In this arrangement, systems that implement the channel scheduling module 2 receive data sent from the user devices 40 of the users 205 that represents the user actions/user activity taken by the user 205 that are relevant to the channel scheduling module 2, such as but not limited to actions taken by the user 205 to view or select content, including one or more of the user actions listed herein. The user devices 40 communicate the data over a network, such as the cloud 215, to the channel scheduling module 2. The channel scheduling module 2 records the user actions in order to generate learn actions and build and update the user profiles that can be used together to make a channel schedule. The channel scheduling module 2 can communicate requests and other data from the user devices 40 and/or channel scheduler 22 to the content provider systems 210 over a network, such as the cloud 215, in order to provide the channel schedule to the content provider systems 210.

Other system arrangements that provide similar functionality to determine one or more channel schedules for a group of users are possible.

Figure 4:
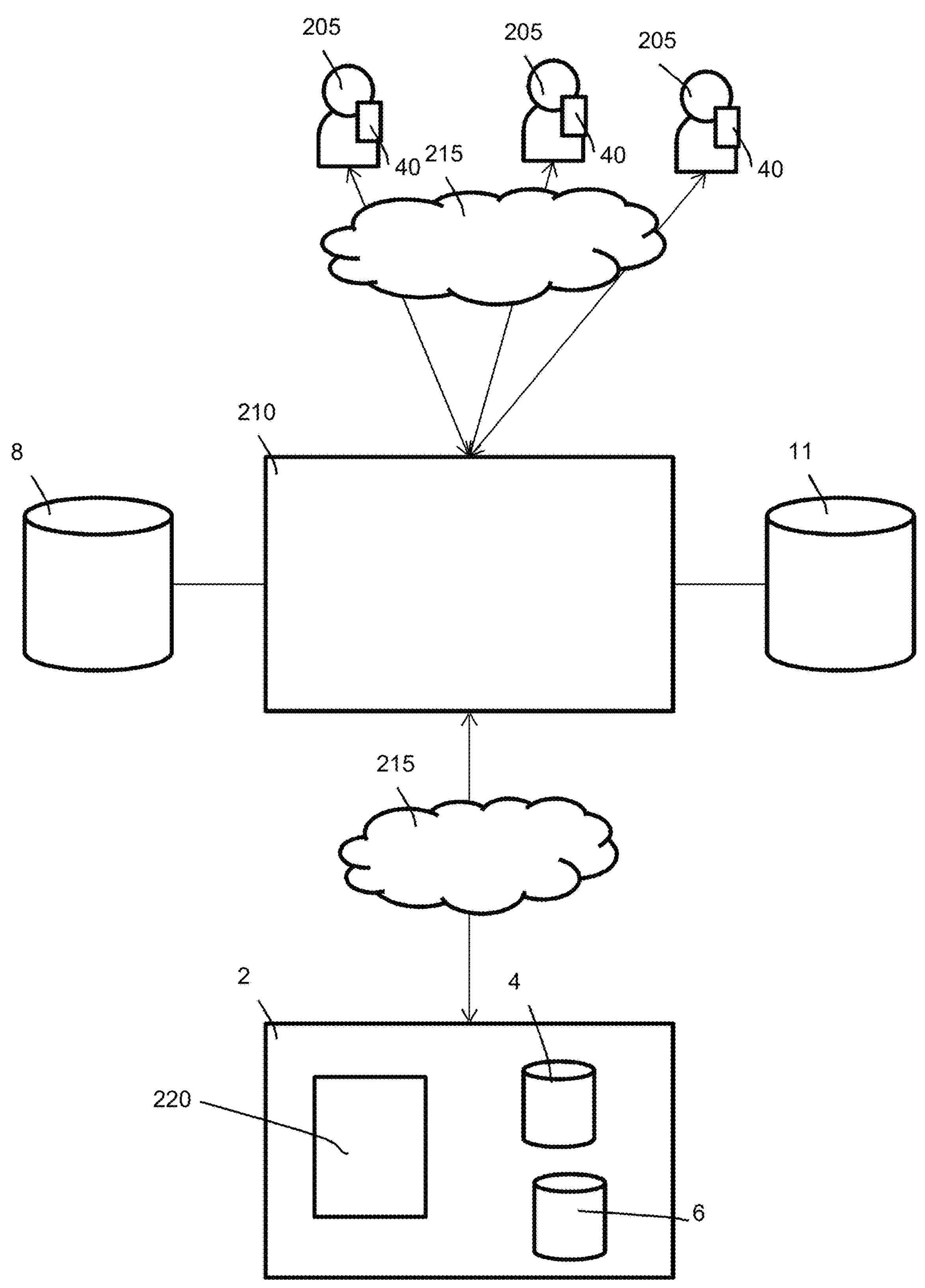
FIG. 4 is a simplified schematic of an alternative system arrangement to that of FIG. 3.

FIG. 4 shows another system configuration in a "back-end" processing arrangement. In this arrangement, the user devices 40 interface directly (over a network such as the cloud 215) with the systems of a content provider 210, which may handle requests from and provide content to the user devices 40. User interaction data from the user devices 40 may be provided by the systems of the content provider 210 to the channel scheduling module 2 (e.g. over a network such as the cloud 215) in order for the channel scheduling module 2 to identify learn actions and build user profiles for a plurality of users 205. The channel scheduling module 2 may therefore gather the data from the user profiles in order to determine a channel schedule for the user group. However, in some cases, user activity may not be monitored for the purposes of determining the channel schedule and, in this case, no information may be provided from the user devices 40 to the channel scheduling module 2 and the user cache 6 and storage device 4 may not be required at the channel scheduling module 2. In that case, the channel schedule may determined purely on the basis the metadata associated with the content catalogue 8, or other criteria may be applied such as constraints relating to the language of the content items; regionality of the content items; availability of the content items; the type of the content items; or a rule associated with the content items.

Figure 5:
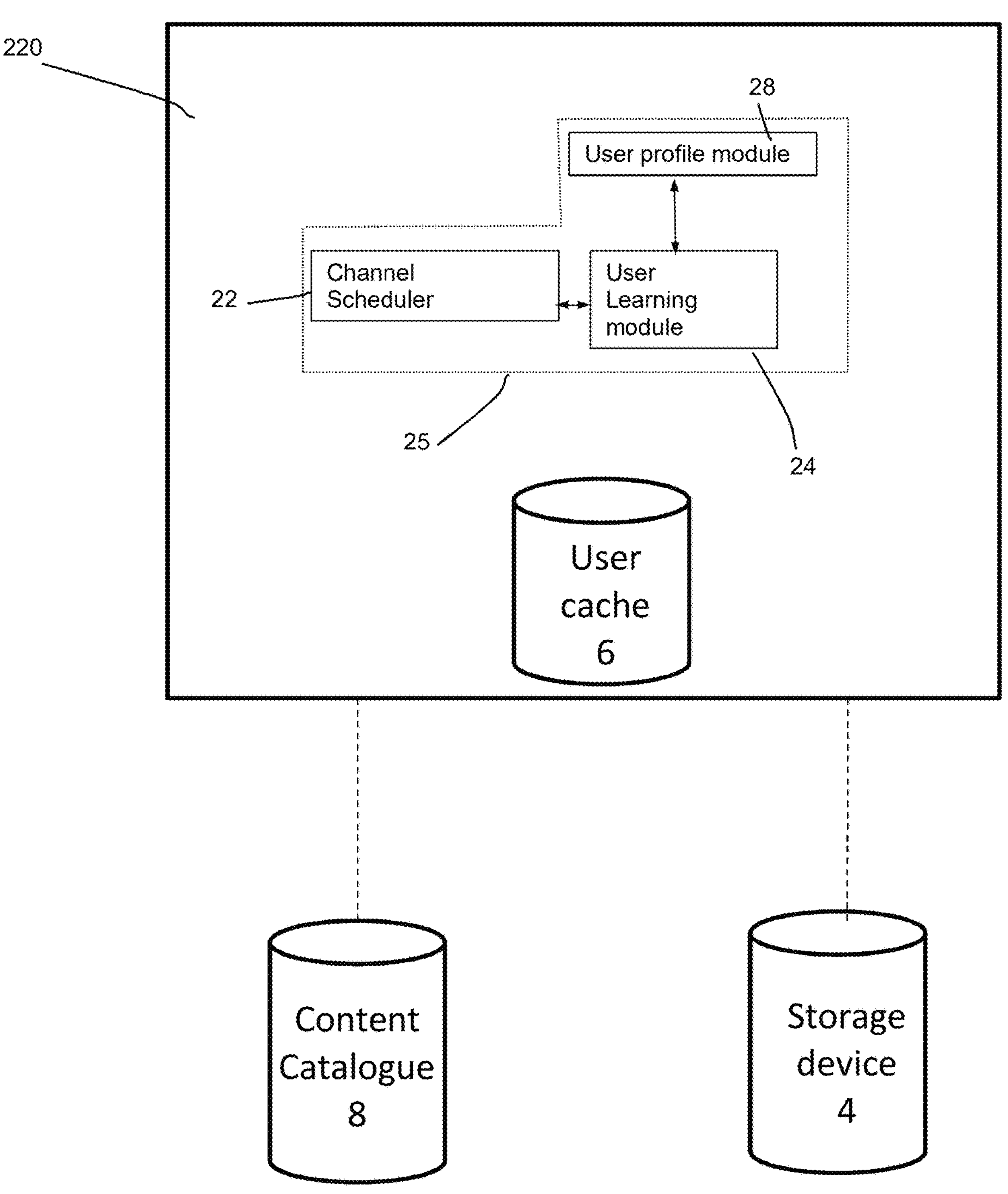
FIG. 5 is a schematic of a system for creating a channel schedule.

FIG. 5 shows an arrangement of processing resource 220 for implementing the channel scheduling module 2, including the user learning module 24 and the channel scheduler 22. In this embodiment, the user learning module 24 is part of a channel system 25, which includes the channel scheduler 22 and a user profile module 28. However, in other embodiments, the user learning module 24 and user profile module 28 may not be required or may be separated from the channel scheduler 22. The processing resource 220 can optionally comprise one or more processors, FPGAS, ASICS or the like, which may be provided in a single machine or distributed over a plurality of machines, and may be locally arranged or remote from each other and connected over a network. The processing resource 220 is configured to communicate with content databases, such as the content catalogue 8, to retrieve content available for selecting for a channel schedule. The processing resource 220 comprises rapid access storage, such as user cache 6, which may be implemented in RAM or SSD storage to provide fast access to user profiles and actions that the processing resource 220 is currently, and will next be, performing operations on. The processing resource 220 is also configured to communicate with external storage such as the storage device 4 on which user actions and profiles are stored and can be retrieved into the user cache 6 when needed by the processing resource 220. The channel scheduler 22 can be accessed by the operatives of the channel scheduling system, which may include operators of the content provider systems 210 (or other suitable users) to provide a channel schedule to content providers. As part of this, the channel scheduler 22 can obtain metadata associated with a plurality of content items in a content catalogue 8, the metadata representing at least some properties of the content items; segment the plurality of content items into segments based on metadata similarity; create one or more channels based on the segments; and schedule the plurality of content items, in the respective segments, for the one or more channels.

The above description has been provided concerning the structure of the system of FIG. 1. Operation of the system of FIG. 1 to provide a channel schedule according to one mode of operation is now described with reference to the flowchart of FIG. 6.

Figure 6:
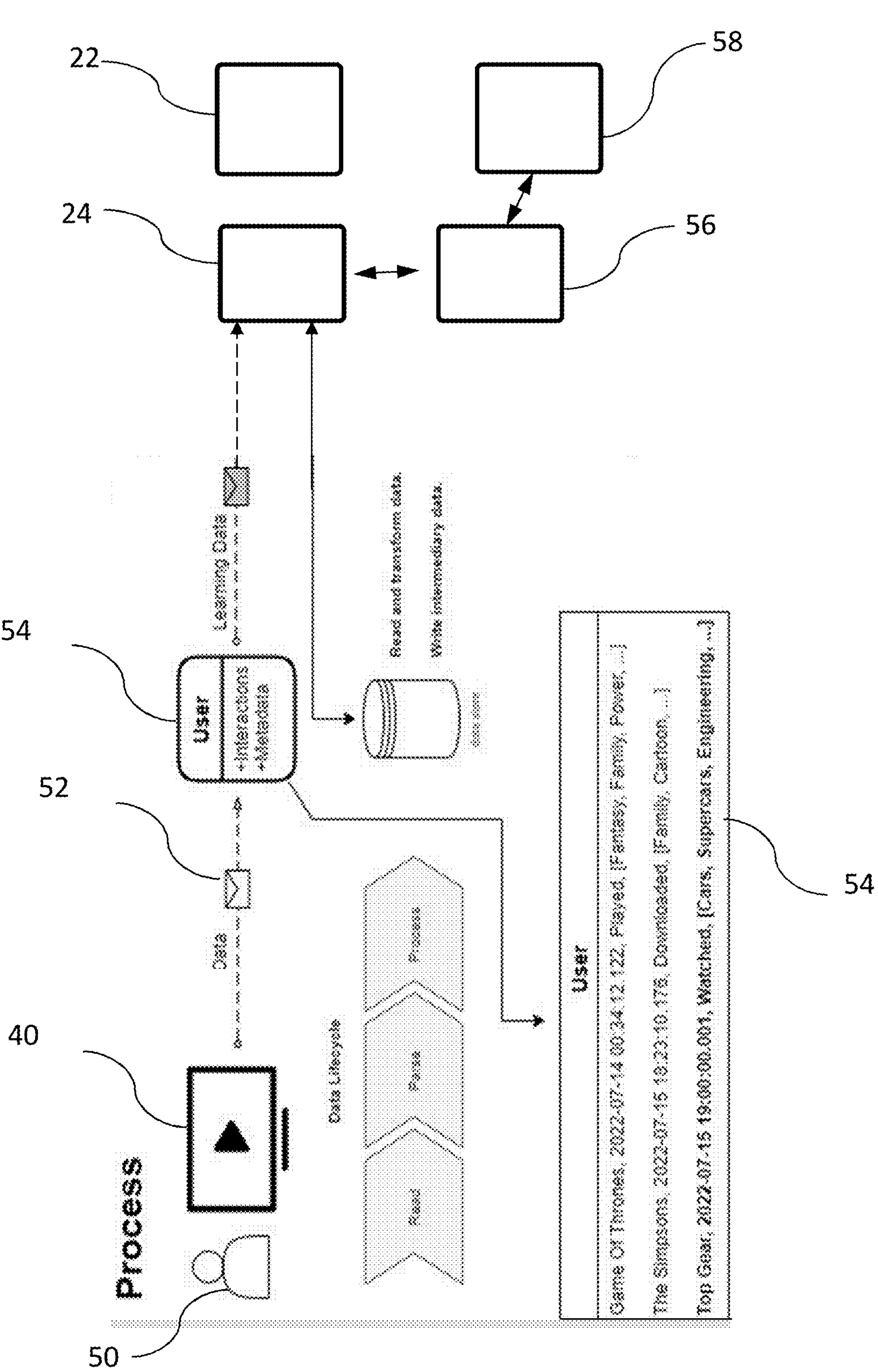
FIG. 6 is a schematic illustration of the generation of user records using the system of FIG. 1.

FIG. 6 illustrates schematically a process for generation of a channel schedule using the system of FIG. 1. Only certain components of the system of FIG. 1 are included in FIG. 6, for clarity.

FIG. 6 shows a user 50 watching a television program that they have selected on user device 40. Data 52 representing the user's activity is sent to the user learning module 24 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record or user profile for the user.

A user record 54 for the user is illustrated schematically in FIG. 6. An expanded version of at least part of the user record is also shown in FIG. 6 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 6. For example, at least the metadata items cars, supercars and engineering are associated with the Top Gear episode. In practice there will be many more items of metadata associated with each item of content.

In general, a user record 54 will include records of far larger numbers of items of content than shown for the purposes of illustration in FIG. 6. However, such a small number of items content might be found for a new user or for a temporary user of a system. For example in some embodiments, the system may be used for a user who is a guest in a hotel or traveler in a vehicle or transport system, and it is a feature of some embodiments that user profiles can be generated even for such temporary or short-term users.

Next, user data in respect of the user 50 is sent to the user learning module 24 in order to generate or update a user profile for the user 50.

In some modes of operation, the entire user record is sent to the user learning module 24 each time the user profile for the user is to be updated, and the user profile is regenerated based on the entire user record. In other modes of operation, only changes to the user record are sent to the user learning module 24, and then the user profile for the user is retrieved and updated based only on the changes to the user record (for example based on the user having watched one or more new items of content).

In the example shown in FIG. 6, for simplicity for the purposes of illustration, the user record sent to the user learning module 24 consists only of the record for the latest item of content viewed, in this case Top Gear.

In this example, the user record includes the metadata items 'cars', 'supercars', 'engineering' and 'talk-show'.

The user learning module 24 in this embodiment then performs a search of various data sources 56, for example in the cloud, to determine any other information concerning the item of content. For example, various databases can be consulted that include additional information concerning television programs or other items of content.

In the present embodiment, the record for the item of content and any other information found from the search of data sources 56 is subject to processing by sub-module 58 that matches the metadata and other information for the item of content to an ontology of metadata terms that are maintained by the system. Thus, the metadata for the item of content can be enriched, corrected or supplemented.

In some embodiments, the metadata includes features or properties of the item of content and a weighting for the importance of the feature in the item of content. For example, the metadata may comprise the name of an actor in the item of content and the weighting may represent the importance of the actor in the item of content—for example a high weighting would be given to a lead actor while a low weighting would be given to an actor playing a minor role. In another example, the metadata may comprise a mood (e.g. happy, sad, dark, spooky) associated with the item of content and the weighting may represent the dominance of the mood in the item of content.

In the present embodiment the ontology consists of around 38,000 terms that can be used as metadata to represent items of content, for deep content understanding. Any other suitable ontology can be used in other embodiments. In some embodiments, no ontology is used and the raw metadata associated with the item of content (for example, provided by the content maker, distributor or broadcaster) is used without amendment or enrichment.

The metadata (and optionally its weighting) for the item of content is stored in the user record in the hard disk storage 4.

When a channel scheduling session is required, for example, when a request to provide a channel schedule is received by the channel scheduling module 2 from an operator device (e.g. a content provider), the channel scheduler 22 retrieves as inputs, for example, via the user cache 6, the user profiles (or at least some of the information in the user profiles) from the storage device 4 and the metadata associated with available content from the content catalogue 8.

The channel scheduler 22 then uses these inputs to segment the plurality of content items into segments based on metadata similarity; create one or more channels based on the segments; and schedule the plurality of content items, in the respective segments, for the one or more channels. These steps may be performed in a number of ways.

In general, the method may comprise ranking the plurality of content items in the respective segments and selecting content items for scheduling, based on the ranking; and checking constraints associated with the plurality of content items and selecting content items for scheduling, in view of the constraints.

The ranking and/or constraints may be based on one or more of: a popularity of the content items; a language of the content items; regionality of the content items (e.g. some content may only be available in certain regions or countries); availability of the content items (e.g. content may only be available for a limited period of time, such as a week); a type of the content items (e.g. TV program or film); metadata associated with the content items; a rule associated with the content items (e.g. based on episode order or time of transmission); or user activity associated with the content items.

The channel scheduler 22 may be comprised of one or more components, functional elements or procedures to carry out the above steps. In a non-limiting example, the channel scheduler 22 may comprise a trained machine learning model, which is trained to take as inputs the weighting of the metadata for the content items in the content catalogue, along with the weighting of the metadata associated with a plurality of (e.g. all) user profiles and to generate a ranking of the best matching content items in each segment, based on the weighting of the metadata. The best matching content items may comprise, for example, a list of the top 200 ranked content items for each channel, although this may depend on the length of the schedule being created (e.g. for a week or longer) and the number of program hours of content that is required. This initial output may be relayed to another component, functional element or procedure for selecting the content items for the one or more channel schedules, and scheduling the content items taking into account in any necessary constraints (e.g. language, regionality, rule etc.).

In some embodiments, the ranking may be based on popularity (e.g. among the user group) and/or language instead of, or in addition to (e.g. a refinement of), a ranking based on all of the user profiles. This may ensure that any very close matches that are obscure (i.e. very old content) are filtered out and only non-obscure results, in a preferred language, are selected for inclusion in a channel schedule.

In some, but not all, embodiments, a trained machine learning model or other model may be used. For example, a clustering model may be used which may comprise a Kohenen neural network or KMeans clustering technique to cluster the content items into distinct groups, which are unknown to begin with.

In some embodiments, the trained model or other process is applied directly to the metadata without also enriching or mapping to or otherwise using the ontology. In some embodiments more than one trained model is used, for example one or more trained models to enrich or modify metadata associated with the content items based on the ontology or other further data set, and one or more models to determine the segments, channels, ranking and scheduling.

In some embodiments, the model may assign scores to each of the items of content based on how closely the content metadata matches that of the user profiles in the user group. In some cases, a further process may be carried out to aggregate the user profiles for the user group to determine global user profile information containing the relative weighting of metadata across the group.

This approach may allow for a more accurate and effective technique for determining channels and scheduling content items, that may appeal to a large proportion of the user group. As such, users may be presented with content according to channel schedules that are based on segments of content they are likely to enjoy.

Figure 7:
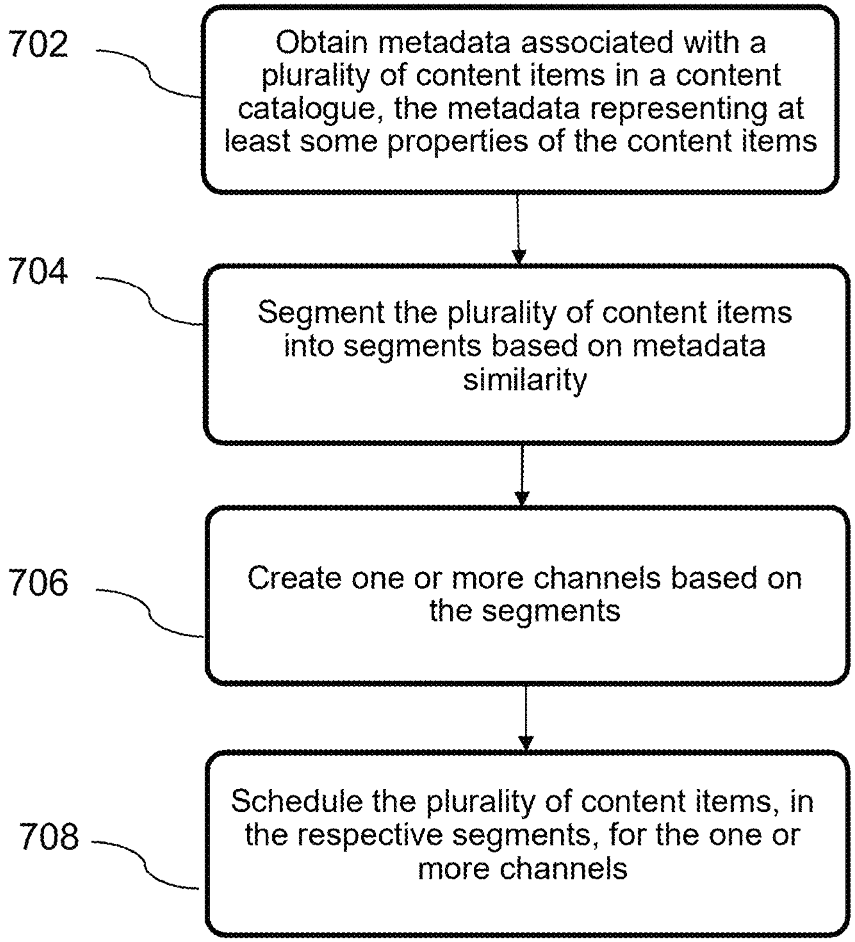
FIG. 7 is an overview of a method for creating a channel schedule.

FIG. 7 is an overview of a computer-implemented method for creating a channel schedule for a linear broadcasting content provider, in accordance with an embodiment.

In general, the method comprises, obtaining metadata associated with a plurality of content items in a content catalogue in a step 702, the metadata representing at least some properties of the content items. Segmenting the plurality of content items into segments based on metadata similarity in a step 704. Creating one or more channels based on the segments in a step 706 and scheduling the plurality of content items, in the respective segments, for the one or more channels in a step 708.

The method may be stored on a non-transitory computer-readable medium as computer-readable instructions that a processing circuitry, for example, in the channel scheduler 22, can execute.

The live nature of linear broadcast content means that user personalization options are limited. Content, such as TV programs, are broadcast at a set day and time to multiple receivers in a live data stream. Unless the content is recorded locally, users can only watch the content at the time it is aired. This type of system employs multicasting in which content is sent once to multiple users at the same time (i.e. it is a one-to-many distribution system). This contrasts with unicasting systems whereby content may be provided on a one-to-one basis such that individuals can receive the content they want when they want it. However, unicasting systems require a huge amount of bandwidth for streaming content directly to many thousands or millions of users potentially at the same time. Multicasting systems are more efficient in that the same content is broadcast to multiple users at once. However, as users are often presented with many different sources of content and potentially many different live streamed channels there can be a tendency for users to stick to the channels or content that they know they like and, as a result, they may miss out on other content that they may enjoy because it is not a channel they usually watch, for example.

An aim of the present invention, is to economically provide live streamed content to users in an easily accessible way. This may be achieved by specifically taking bulk user preferences into account when creating channels and scheduling content therefor. Thus, although all users will be broadcast the same live-streamed content, both the channels and the channel schedules will include content most likely to be of interest to the users.

In practice, when a scheduling session is initiated the channel scheduler 22 obtains metadata associated with a plurality of content items in a content catalogue 8. The content catalogue 8 may first be created by including already scheduled content (for future streaming by a content provider) plus other content that is available for scheduling by the content provider and past content that may have been broadcast previously (e.g. in last week/month/year). The content catalogue 8 may comprise content information comprising at least an identifier for each content item. The content information may also comprise one or more of: a title, a channel on which it is due to be broadcast, a language, an age rating, a rule regarding when the content can be broadcast, a synopsis and any other metadata. The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer. In some cases, the metadata may need to be generated or enriched with keywords designed for content discovery. In some cases, the metadata may be selected from an ontology of over 40 k features expertly chosen for content discovery (e.g. relating to subject, category, subcategory, theme, mood, character type, style, setting etc.). The application of metadata may comprise using a trained machine learning model, which takes the content items as inputs and outputs a weighting of applicable metadata for each content item. In some cases the metadata may already be generated for each content item and stored in a database, which can be accessed by the channel scheduler 22.

The channel scheduler 22 then applies a process for catalogue segmentation leveraging the enriched metadata content to segment the content catalogue 8 into segments based on metadata similarity. The segments may be based on genres or themes to create thematic channels or more advanced techniques may be used to create channels based on features like mood, setting and character type. For example, an auction channel, an auto-racing channel, and a dance channel may be identified based on the segmentation. The process for segmentation may comprise using a trained machine learning model, which takes the metadata for the content items as inputs and outputs a number of possible segments into which the content items may be grouped, based on the metadata. Channels may then be created for one or more of the segments.

The channel scheduler 22 may then apply an intelligent scheduling process to schedule the plurality of content items, in the respective segments, for the one or more channels. This may comprise using a trained machine learning model, which takes scheduling information relating to each content item for a chosen channel as input and outputs a schedule in which the content items are put into appropriate timeslots based on the scheduling information. For example, the scheduling information may comprise duration information, episode and/or series order information, suitable time window information (e.g. for playing child friendly content during daytime and adult content at nighttime). The channel schedule may comprise a list comprising at least content identifiers for the scheduled content items and a selected timeslot for broadcasting the scheduled content items.

The channel scheduler 22 may then communicate the schedule for the one or more channels to the content provider server 10.

Figure 8:
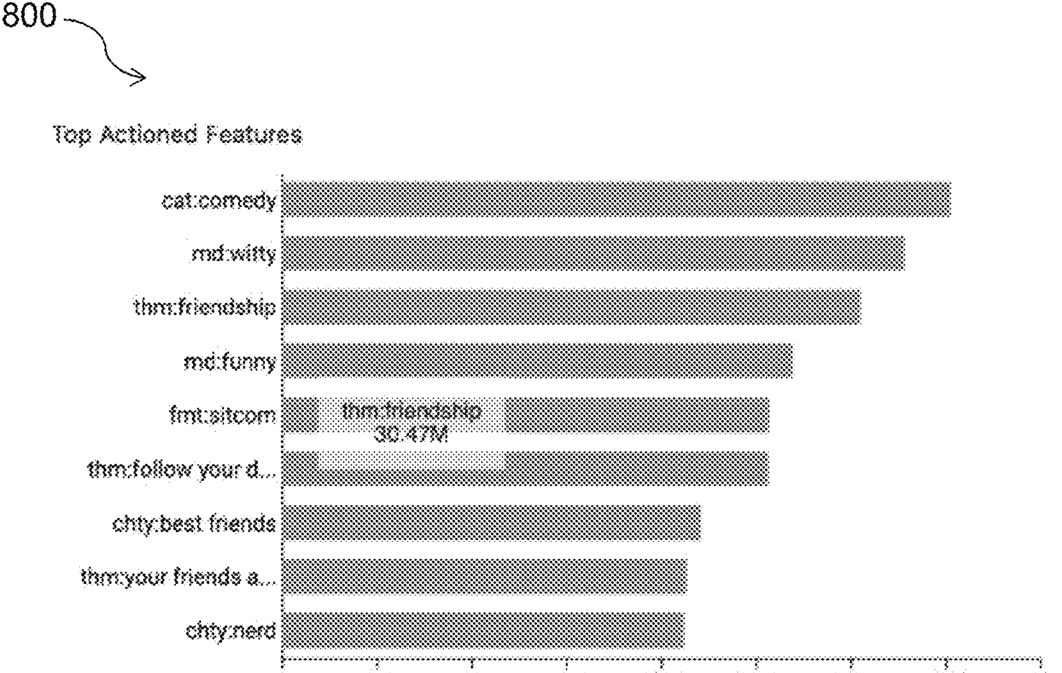
FIG. 8 is a graph showing top actioned features according to metadata gathered from millions of users.

Optionally, bulk viewer behaviour may be taken into account into optimise one or more of the segmentation/channel selection; the selection of content items to be scheduled for each channel and/or the scheduling process itself. For example, FIG. 8 shows a graph 800 of top actioned features according to metadata gathered from millions of user profiles, in accordance with the user learning process described above. This indicates that the most popular category of content among the user population is comedy, with the next most popular grouping having a mood designated as witty and the third most popular grouping have a theme of friendship. As such, a channel may be created for witty and/or comedy content and another channel may be created for content relating to the theme of friendship. Other channels may also be proposed for the next most popular groupings. In some cases, for example, the top viewed genres, subgenres, themes, lead actors or content in general, may be used to determine the type of channels to create. The user data may indicate that, for example, the same users generally watch two or more types of content (e.g. users generally watch both mystery and crime) and therefore a combined mystery and crime channel may be proposed. Thus, the segmentation and channel selection may be determined based on the preferences of the user group. In other words, the segments may be ranked based on user preferences.

Additionally or alternatively, the selection of content items to be scheduled for each channel may be based on bulk user preferences. For example, once the segmentation and channel selection is complete, the individual content items in each segment may be ranked based on one or more of: a popularity of the content items; a language of the content items; regionality of the content items; availability of the content items; a type of the content items; metadata associated with the content items; a rule associated with the content items; or user activity associated with the content items. Thus, the most popular or most actioned content items may be selected for scheduling.

Additionally or alternatively, the scheduling process can be optimised based on viewing behaviour. For example, based on the user data it may be determined that, for example, certain features are watched more at certain times; at specific times, users generally watch certain content; and users generally binge-watch at certain times or in relation to particular content. Additionally or alternatively, the scheduling process can be optimised taking into account constraints that may be associated with the plurality of content items (e.g. rules regarding when content must or must not be broadcast). Thus, the schedule for each channel may be determined based on user engagement patterns.

There may be an on-going monitoring and updating process (e.g. to drop, change or add channels or content), which may be carried out periodically (e.g. every week) or, for example, when it is determined that user viewing habits or preferences have changed.

It will be understood that the present invention may be extremely useful for linear broadcasting content providers, particularly, but not exclusively, for FAST channel providers.

The present invention, advantageously utilised machine learning and natural language processing techniques to efficiently and effectively select and schedule content.

The scheduling may be for the next 24 hours, the next 48 hours, the next 3 days, the next 5 days or the next 7 days, for example.

The scheduling information and/or the content information and/or the metadata may be stored in a local memory or cache for processing by the channel scheduler 22.

For each timeslot in the predetermined time period for a schedule, the channel scheduler 22 may rank the content items that are selected to be broadcast for the chosen channel. The timeslot may depend on the content and/or channel information. For example, for a channel comprising content for adults, the timeslot may be 30 minutes or 1 hour as most adult TV programs are of these durations. However, for a channel comprising content for children, the timeslot may be 5 minutes or 10 minutes as many children TV programs are of these durations. The timeslot may be predetermined or based on a minimum duration of all content that may be broadcast at a particular time in the schedule.

In some embodiments, the ranking for each content item may be based a popularity of the content items. For example, popularity data may be obtained for a group of users (or all users), based on prior user interactions with the same or similar content (e.g. for a different episode of the same program). The prior user interactions may be monitored using a process as described in relation to FIG. 6. The popularity of each content item may be based on a number of users viewing the content. The popularity data may stored in a database accessible by the channel scheduler 22 and the ranking may be based on a comparison of the popularity data stored in relation to each content item that may be scheduled for the chosen channel. The most popular content may be ranked first and subsequently selected for inclusion in the channel schedule.

The channel scheduler 22 may then move to the next timeslot in the predetermined time period in order to rank the content items that are selected to be broadcast for the chosen channel. In practice, the start time for the next timeslot may be determined based on the end time of the selected content in the previous timeslot. This process may be repeated for all timeslots in the predetermined time period to create a complete and continuous channel schedule.

In some embodiments, the ranking for each content item may take into account a language of the content items. For example, Spanish language content may be more highly ranked than English language content when creating a channel schedule for users based in Spain.

In some embodiments, the ranking for each content item may take into account a type of the content items. For example, the type might indicate a TV program, a radio program or a film. In some embodiments, different types of programs may be preferred at different times of day. For example, for an early morning timeslot a radio program may be more highly ranked, for a mid-day timeslot a TV program may be more highly ranked and for an evening timeslot a film may be more highly ranked.

In some embodiments, the ranking for each content item may take into account a rule associated with the content items. For example, the rule may relate to a type of content required to precede or succeed a certain item of content (e.g. a specific combination of programs may be required or prohibited; or items having a maximum or minimum popularity may be required before or after a certain content item).

In some embodiments, the ranking for each content item may take into account user activity associated with at least one user. Thus, knowledge of viewing patterns may be utilised to create a channel schedule designed to minimise viewer drop-off.

For example, user activity may be monitored and used to determine which programs are popular at different times of the day or week. For programs that are usually repeated at several different times, the channel scheduler 22 can select the timeslot best suited for a particular user group.

The user activity may comprise interactions by the at least one user in relation to a plurality of content items. The method may further comprise monitoring user activity including identifying content that a user of a user device has interacted with and adding content item identifiers, for the identified content, to user data.

The plurality of content items interacted with by the at least one user may comprise content items having been one or more of: selected, viewed, recorded, purchased, read, listened to, played, shared, content rated, commented on, downloaded, watched, bookmarked, browsed, added to a shopping basket, watched or listened to a trailer, clicked on a search result, remotely recorded, set a reminder for, liked, disliked, tweeted, posted on social media, played purchased content, stopped watching, stopped playing or otherwise interacted with.

The user activity may be associated with a plurality of content items interacted with by a plurality of users. In which case, the ranking may be based on the preferences of a user group, as opposed to an individual user. The user group may comprise all users or a subset of all users (e.g. based on a categorisation, which may be by language, demographic, likes etc.).

In some embodiments, the ranking for each content item may be based on recommendation data derived from monitoring user activity. The recommendation data may be determined by identifying, for example, collaborative content comprising content viewed by other users with similar tastes.

The method may comprise determining a weighting for the metadata associated with the content items and using the weighting to determine the ranking for each content item in the respective segments.

The user activity associated with the content items may comprise interaction, by a plurality of users, in relation to the content items and/or content items with similar metadata.

The step of segmenting the plurality of content items into segments may comprise: obtaining user-derived metadata representing at least some properties associated with a plurality of content items interacted with by a plurality of users; and comparing the user-derived metadata with the metadata representing at least some properties of the content items in the content catalogue to determine the segments most likely to be popular with the plurality of users.

The method may comprise determining a first weighting for the user-derived metadata and obtaining a second weighting for the metadata representing at least some properties of the content items in the content catalogue and comparing the second weighting with the first weighting to determine the segments.

The segmentation may be based on how closely the metadata representing at least some properties of the content items in the content catalogue matches the user-derived metadata.

The scheduling of the plurality of content items may comprise retrieving, from a memory, scheduling information relating to each content item; and determining an appropriate timeslot for the plurality of content items according to the scheduling information.

The method may further comprise optimising the scheduling based on user activity associated with the content items.

The step of creating one or more channels based on the segments may comprise identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users.

The method may further comprising repeating one or more of the steps of: obtaining metadata associated with a plurality of content items in a content catalogue, the metadata representing at least some properties of the content items; segmenting the plurality of content items into segments based on metadata similarity; creating one or more channels based on the segments; and scheduling the plurality of content items, in the respective segments, for the one or more channels; at predefined intervals and/or on receipt of an instruction from an operator and/or in response to a determination that the segmenting be updated.

The linear broadcast content may be provided by a Free Ad-supported Streaming Television (FAST) channel provider.

The method may further comprise providing the one or more channel schedules to the linear broadcasting content provider.

The interaction, by the plurality of users, in relation to the content items and/or content items with similar metadata may comprise content items having been one or more of: selected, viewed, recorded, purchased, read, listened to, played, shared, content rated, commented on, downloaded, watched, bookmarked, browsed, added to a shopping basket, watched or listened to a trailer, clicked on a search result, remotely recorded, set a reminder for, liked, disliked, tweeted, posted on social media, played purchased content, stopped watching, stopped playing or otherwise interacted with.

The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

The content items may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The method may further comprises storing the user activity and/or interacted content items and/or metadata associated with the interacted content items in user profiles in a first memory resource remote from user devices and/or storing the scheduled content items and/or metadata associated with the scheduled content items in one or more content memory resource.

In some embodiments, one or more different ranking methods may be employed, alone or in combination, for the same or different channels or timeslots.

An important technical consideration concerns the amount of data that the system and method need to contend with. For example, there may be 50 million users and user profiles associated with a given content provider, billions of content items and billions of data points (e.g. relating to the metadata). Accordingly, the system must be configured to handle such huge volumes of data in an efficient and yet accurate manner in order to provide useful results.

It will be understood that the channel scheduler 22 may conduct a channel scheduling session whilst maintaining in the RAM 7 user data for a plurality of the users substantially simultaneously. For example, user data may be maintained in the RAM 7 for thousands, hundreds of thousands or even millions of users substantially simultaneously, depending on the RAM 7 storage capacity available and the number of subscribers or other users associated with the system.

As described herein, the system and method of the present disclosure can be used advantageously to provide efficient and effective channel schedules. Advantageously, the channel schedules can be optimized for a group of users.

The above description of specific embodiments is made by way of example only. A skilled person will appreciate that variations of the described embodiments may be made without departing from the scope of the invention.

The invention claimed is:

1. A computer-implemented method for creating a channel schedule for a linear broadcasting content provider, the method comprising:

obtaining metadata associated with a plurality of content items in a content catalogue, the metadata representing at least some properties of the content items;

segmenting the plurality of content items into segments based on metadata similarity;

creating one or more channels based on the segments including identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users; and scheduling the plurality of content items, in the respective segments, for the one or more channels.

2. The computer-implemented method of claim 1 further comprising one or more of: ranking the plurality of content items in the respective segments and selecting content items for scheduling, based on the ranking; and checking constraints associated with the plurality of content items and selecting content items for scheduling, in view of the constraints.

3. The computer-implemented method of claim 2 wherein the ranking and/or constraints are based on one or more of: a popularity of the content items; a language of the content items; regionality of the content items; availability of the content items; a type of the content items; metadata associated with the content items; a rule associated with the content items; or user activity associated with the content items.

4. The computer-implemented method of claim 3 further comprising determining a weighting for the metadata associated with the content items and using the weighting to determine the ranking for each content item in the respective segments.

5. The computer-implemented method of claim 3 wherein the user activity associated with the content items comprises interaction, by a plurality of users, in relation to the content items and/or content items with similar metadata.

6. The computer-implemented method of claim 1 wherein the step of segmenting the plurality of content items into segments comprises:

obtaining user-derived metadata representing at least some properties associated with a plurality of content items interacted with by a plurality of users; and comparing the user-derived metadata with the metadata representing at least some properties of the content items in the content catalogue to determine the segments most likely to be popular with the plurality of users.

7. The computer-implemented method of claim 6 further comprising determining a first weighting for the user-derived metadata and obtaining a second weighting for the metadata representing at least some properties of the content items in the content catalogue and comparing the second weighting with the first weighting to determine the segments.

8. The computer-implemented method of claim 7, wherein the segmentation is based on how closely the metadata representing at least some properties of the content items in the content catalogue matches the user-derived metadata.

9. The computer-implemented method of claim 1 wherein the scheduling of the plurality of content items comprises retrieving, from a memory, scheduling information relating to each content item; and determining an appropriate timeslot for the plurality of content items according to the scheduling information.

10. The computer-implemented method of claim 9 further comprising optimising the scheduling based on user activity associated with the content items.

11. The computer-implemented method of claim 1 wherein the step of creating one or more channels based on the segments comprises identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users.

12. The computer-implemented method of claim 1 further comprising repeating the steps of:

obtaining metadata associated with a plurality of content items in a content catalogue, the metadata representing at least some properties of the content items;

segmenting the plurality of content items into segments based on metadata similarity;

creating one or more channels based on the segments including identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users; and scheduling the plurality of content items, in the respective segments, for the one or more channels at predefined intervals and/or on receipt of an instruction from an operator and/or in response to a determination that the segmenting be updated.

13. The computer-implemented method of claim 1 wherein the linear broadcast content is provided by a Free Ad-supported Streaming Television (FAST) channel provider.

14. The computer-implemented method of claim 1 further comprising providing the one or more channel schedules to the linear broadcasting content provider.

15. The computer-implemented method of claim 5 wherein the interaction, by the plurality of users, in relation to the content items and/or content items with similar metadata comprises content items having been one or more of: selected, viewed, recorded, purchased, read, listened to, played, shared, content rated, commented on, downloaded, watched, bookmarked, browsed, added to a shopping basket, watched or listened to a trailer, clicked on a search result, remotely recorded, set a reminder for, liked, disliked, tweeted, posted on social media, played purchased content, stopped watching, stopped playing or otherwise interacted with.

16. The computer-implemented method of claim 1 wherein the metadata comprises data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

17. The computer-implemented method of claim 1 wherein the content items comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

18. The computer-implemented method of claim 5 further comprising storing the user activity and/or interacted content items and/or metadata associated with the interacted content items in user profiles in a first memory resource remote from user devices and/or storing the scheduled content items and/or metadata associated with the scheduled content items in one or more content memory resource.

19. A system for creating a channel schedule for a linear broadcasting content provider, the system comprising processing circuitry configured to:

obtain metadata associated with a plurality of content items in a content catalogue, the metadata representing at least some properties of the content items;

segment the plurality of content items into segments based on metadata similarity;

create one or more channels based on the segments including identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users; and schedule the plurality of content items, in the respective segments, for the one or more channels.

20. A non-transitory computer-readable medium that comprises computer-readable instructions that are executable to perform a method for creating a channel schedule for a linear broadcasting content provider, the method comprising:

obtaining metadata associated with a plurality of content items in a content catalogue, the metadata representing at least some properties of the content items;

segmenting the plurality of content items into segments based on metadata similarity;

creating one or more channels based on the segments including identifying one or more of the segments containing content items with a greatest amount of metadata similarity amongst the content items and/or containing content items with a greatest amount of metadata similarity between the content items and user-derived metadata representing at least some properties associated with a plurality of content items interacted with by a plurality of users; and scheduling the plurality of content items, in the respective segments, for the one or more channels.

* * * * *